(12) United States Patent
Wen et al.

(10) Patent No.: US 6,782,352 B2
(45) Date of Patent: Aug. 24, 2004

(54) SYSTEM AND METHOD FOR MONITORING SERVER HOST OPERATION

(75) Inventors: Sayling Wen, Taipei (TW); Kuang-Shin Lin, Taipei (TW)

(73) Assignee: Inventec Corporation, Taipei (TW)

( * ) Notice: Subject to any disclaimer, the term of this patent is extended or adjusted under 35 U.S.C. 154(b) by 83 days.

(21) Appl. No.: 10/330,173

(22) Filed: Dec. 27, 2002

(65) Prior Publication Data

US 2003/0125909 A1 Jul. 3, 2003

(30) Foreign Application Priority Data

Dec. 28, 2001 (TW) .......................................... 90132719 A

(51) Int. Cl.[7] .............................................. G06F 15/00
(52) U.S. Cl. ........................ 702/188; 709/204; 709/223; 718/105
(58) Field of Search ........................... 702/62, 122, 127, 702/188; 340/3.1–3.9; 700/9–10; 709/201, 204, 223, 226, 227, 247; 718/105

(56) References Cited

U.S. PATENT DOCUMENTS 6,360,256 B1 * 3/2002 Lim ............................ 709/223
6,678,715 B1 * 1/2004 Ando ......................... 718/105
2002/0188678 A1 * 12/2002 Edecker et al. ............. 709/204

* cited by examiner

Primary Examiner—John Barlow
Assistant Examiner—John Le
(74) Attorney, Agent, or Firm—Mikio Ishimaru

(57) ABSTRACT

A system and a method for monitoring server host operation are proposed. The monitoring system is connected to a plurality of server hosts in a server, and provided with a database containing data of host names and correspondent geographic locations for the server hosts. When an overloaded server host in the server receives a linkage request from a computer device of a client, the monitoring system can search in the database for a properly-loaded server host that is geographically close to the overloaded server host, and allow the computer device of the client to be linked to the properly-loaded server host, thereby achieving immediate interaction between the client and the server.

7 Claims, 3 Drawing Sheets

FIG. 2

| Host name | IP address | Geographical location | |
| --- | --- | --- | --- |
| | | Latitude | Longitude |
| A1 | 192.83.50.0 | N25°0' 49.27" | E121°26'59.66" |
| A2 | 192.83.50.1 | N25°6' 24.30" | E121°30'23.30" |
| A3 | 192.83.50.2 | N25°7' 41.59" | E121°44'17.04" |
| A4 | 192.83.50.3 | N25°10' 27.22" | E121°25'59.55" |
| ⋮ | ⋮ | ⋮ | ⋮ |
| B1 | 192.83.50.64 | N24°5'0" | E120°32'20" |
| B2 | 192.83.50.65 | N24°6'3" | E120°40'14" |
| B3 | 192.83.50.66 | N24°9'46.50" | E120°36'33.47" |
| B4 | 192.83.50.67 | N24°14'56.68" | E120°42'20.89" |
| ⋮ | ⋮ | ⋮ | ⋮ |

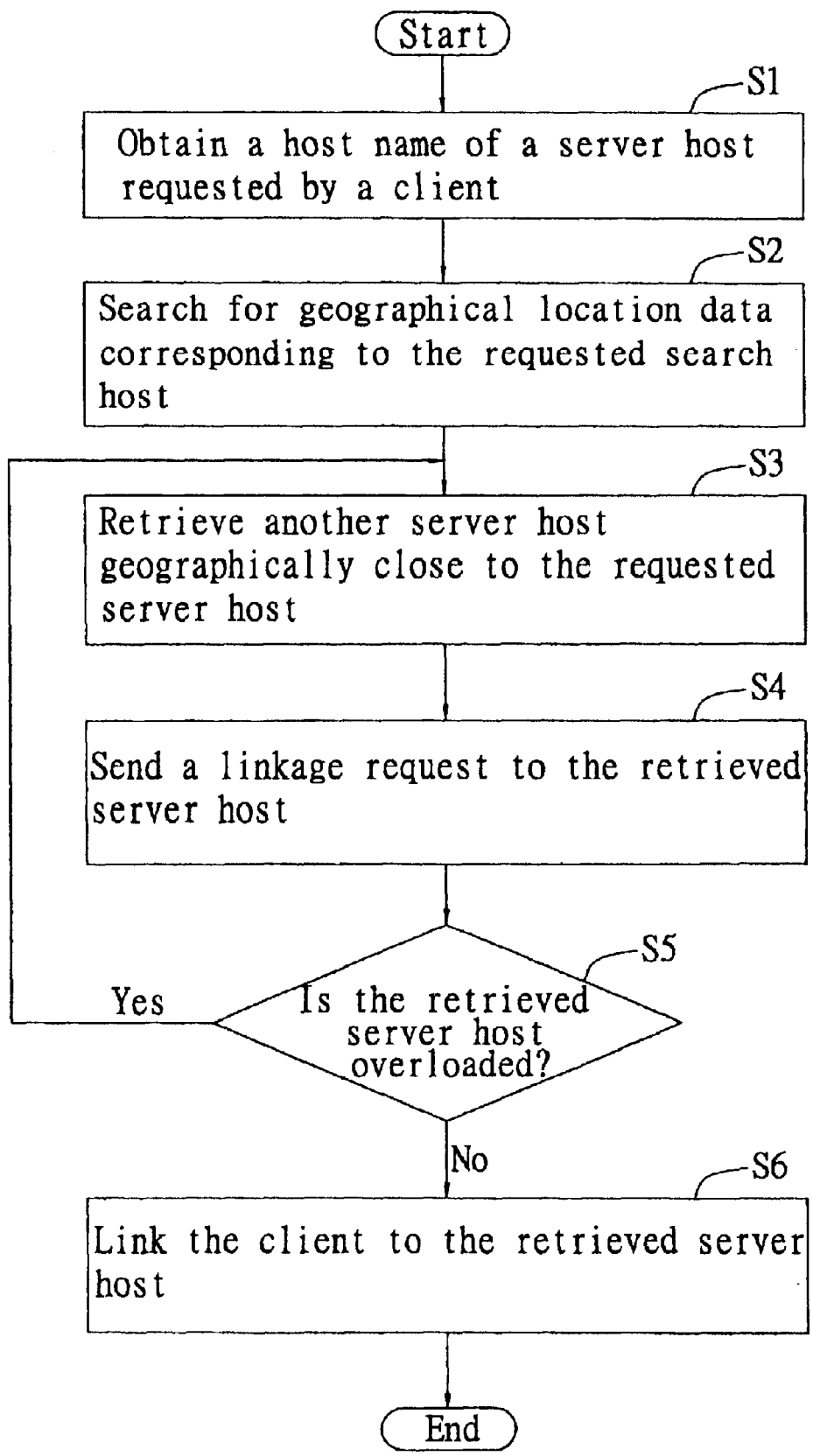

SYSTEM AND METHOD FOR MONITORING SERVER HOST OPERATION

FIELD OF THE INVENTION

The present invention relates to systems and methods for monitoring server host operation, and more particularly, to a monitoring system and method for allowing a client computer to be promptly linked to a properly-loaded server host instead of an overloaded server host that receives a linkage request from the client computer, wherein the properly-loaded server host is selected to be geographically close to the overloaded server.

BACKGROUND OF THE INVENTION

In conventional client/server architecture, mass data are stored in a server, for allowing a client computer to download data from the server as necessary, so as to reduce costs in maintenance, renewal and transmission of data.

However, the foregoing client/server architecture has significant drawbacks. For example, if many computer devices are provided at a client and simultaneously request for linkage with a server, the server would easily become overloaded, and leads to a halt in network operation, causing serious time delays for interaction between the client and server.

Therefore, how to solve the above problems for allowing a server to promptly respond to multiple linkage requests that are simultaneously generated from computer devices of a client, is greatly desired to implement.

SUMMARY OF THE INVENTION

A primary objective of the present invention is to provide a system and a method for monitoring server host operation, whereby a computer device of a client can be instantly linked to a server host in a server, thereby facilitating prompt interaction between the client and the server.

In accordance with the above and other objectives, the present invention proposes a system and a method for monitoring server host operation.

The method for monitoring server host operation is applied to a monitoring system connected to a plurality of server hosts in a server; when an overloaded server host receives a linkage request from a computer device of a client, the monitoring system allows another properly-loaded server host to be linked to computer device of the client, so as to achieve immediate interaction between the client and the server.

The above method comprises the steps of: (1) obtaining a host name of the overloaded server host via the monitoring system; (2) searching in a database for geographic location data corresponding to the obtained host name via the monitoring system, wherein the database stores data of host names and corresponding geographic locations for server hosts in the server; (3) searching in the database for another record of geographic location data close to the location of the overloaded server host via the monitoring system, and retrieving a host name of a corresponding server host located in proximity to the overloaded server host; (4) sending a linkage request to the retrieved server host via the monitoring system, and determining if the retrieved server host is overloaded; if yes, returning to the step (1), or otherwise proceeding with step (5); and (5) linking the computer device to the retrieved server host via the monitoring system, so as to allow immediate interaction between the client and the server.

The system for monitoring server host operation of the invention, is used for allowing a computer device of a client to be linked to a properly-loaded server host in a server if the computer device requests for linkage with an overloaded server host, so as to achieve immediate interaction between the client and the server.

The above system comprises: a database, including data of host names, IP (Internet Protocol) addresses, and corresponding geographic locations for server hosts in the server; a receiving module, for obtaining a host name of the overloaded server host that is requested for linkage by the computer device of the client; a searching module, for receiving the obtained host name from the receiving module, so as to search in the database for geographical location data corresponding to the received host name of the overloaded server host, whereby the searching module further searches for another record of geographic location data close to the location of the overloaded server host, so as to retrieve a host name of a corresponding server host located in proximity to the overloaded server host; and a responding module, for receiving the retrieved host name from the searching module, and sending a linkage request to the retrieved server host, wherein if the retrieved server host is overloaded, the searching module performs further searches until finding a properly-loaded server host in the server, so as to allow the computer device of the client to be linked to the properly-loaded server host.

In the use of the system and method for monitoring server host operation of the invention, a server can instantly respond to a linkage request from a client, in manner as to immediately link a client computer to a properly-loaded server host, such that interaction between the client and the server can be promptly achieved. This therefore effectively solves problems in the prior art of halting or delay in network operation due to overloading of a server host simultaneously requested for linkage by multiple client computers.

BRIEF DESCRIPTION OF THE DRAWINGS

The present invention can be thoroughly understood by reading the following detailed description of the preferred embodiments, with reference made to accompanying drawings, wherein:

FIG. 2 is a schematic diagram showing data configuration of a database in the monitoring system of FIG. 1; and FIG. 3 is a flowchart showing process steps involved in a method for monitoring server host operation of the invention.

DETAILED DESCRIPTION OF THE PREFERRED EMBODIMENTS

Figure 1:
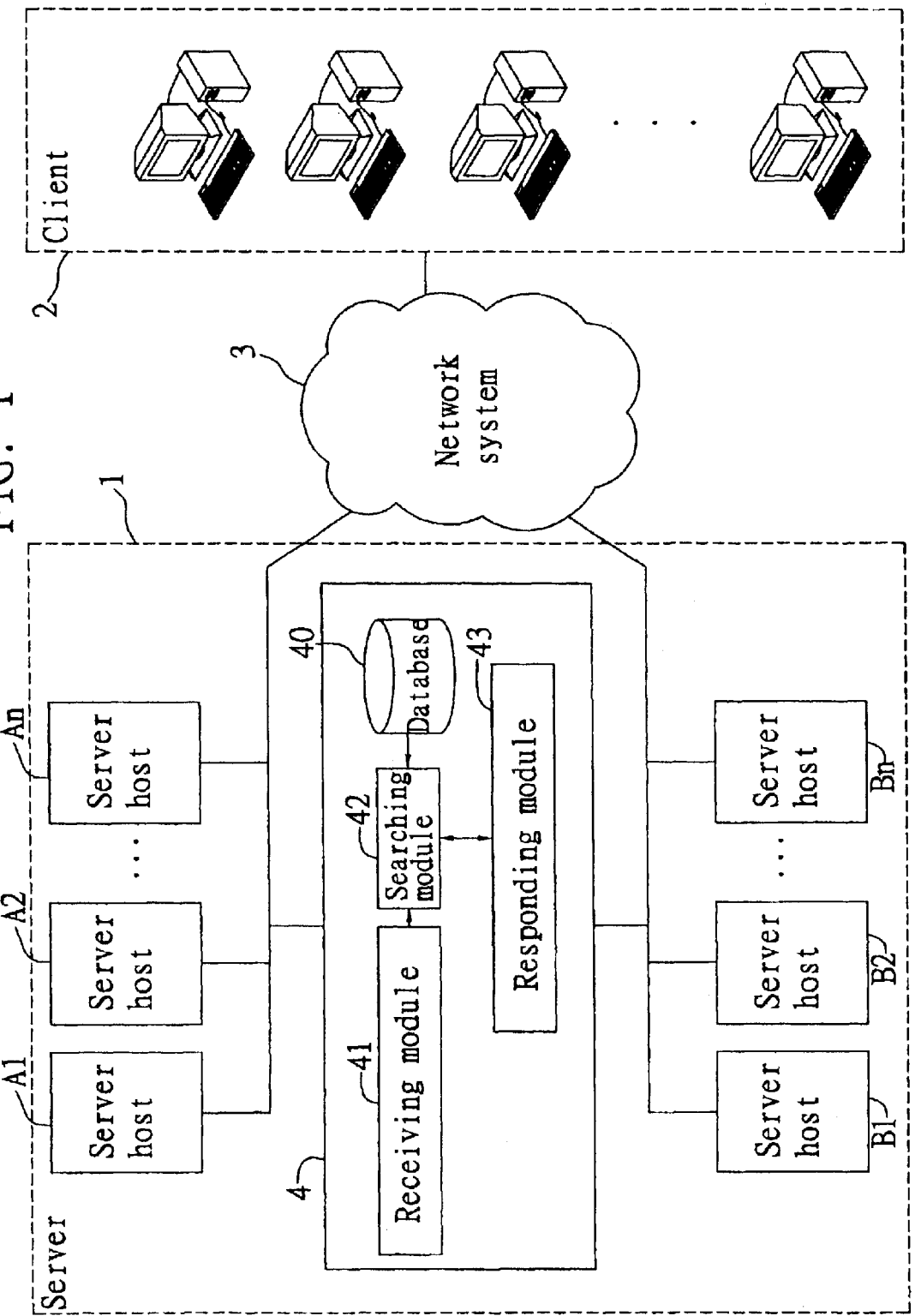
FIG. 1 is a schematic block diagram showing basic configuration of a system for monitoring server host operation of the invention.

Referring to FIG. 1, it illustrates a structural embodiment of a system for monitoring server host operation of the present invention. As shown in the drawing, the system for monitoring server host operation of the invention is established in a system monitoring host 4 of a server 1, wherein the server 1 further comprises a plurality of groups of server hosts (as designated by A1, A2, . . . , An, and 131, , B2, . . . , Bn in the drawing). Server hosts of the same group each stores an identical operation program, and are connected through a network system 3 to the system monitoring host 4. When computer devices of a client 2 request for linkage with the server 1, they can be automatically linked to properly-loaded server hosts through the system monitoring host 4, for allowing the client 2 to promptly interact with the server 1; this would avoid a halt or time delays in network operation caused by overloading of server hosts.

The system for monitoring server host operation, comprises: a database 40, a receiving module 41, a searching module 42, and a responding module 43. In operation, when computer devices of the client 2 request for linkage with the server 1, if the receiving module 41 is informed of requested server hosts being overloaded, the searching module 42 is urged to search data related to the overloaded server hosts from the database 40; according to the searched data, the responding module 43 can link computer devices of the client 2 to properly-loaded server hosts of the server 1.

The database 40 comprises data of host names, IP (Internet Protocol) addresses, and latitude and longitude of corresponding geographical locations for server hosts of the server 1. FIG. 2 illustrates data configuration of the database 40. As shown in the drawing, server hosts (A1, A2, A3, A4, . . . ) and server hosts (B1, B2, B3, B4, . . . ) are pertained to different host groups of different functions, wherein server hosts of the same group are each provided with an identical operation program, and geographically located in different areas. The server hosts are arranged in a manner that, geographically close server hosts are listed adjacently to each other in the database 40. Thereby, when the receiving module 41 informs the searching module 42 of an overloaded server host requested by a computer device of the client 2, the searching module 42 is urged to search in the database 40 for geographic location data corresponding to the requested server host, and then to retrieve another server host that is geographically close to the requested server host (e.g., a server host listed above or next to the requested server host). Data of the retrieved server host are forwarded to the responding module 43 from the searching module 42, whereby the computer device of the client 2 can be connected to the retrieved server host by the responding module 43 for establishing linkage with the server 1.

Therefore, if a server host of the server 1 requested by the client 2 is overloaded, the client 2 can be promptly linked to another properly-loaded server host in the server 1, without causing delays in interaction between the client 2 and the server 1.

FIG. 3 illustrates process steps involved in a method for monitoring server host operation of the invention. The following description is made with reference to FIGS. 1 and 3. First, a computer device of a client 2 requests for linkage with a server host of a server 1; if the requested server host is overloaded, and not capable of being instantly connected with the client 2 (for example, many computer devices of the client 2 simultaneously request to be linked to the same server host of the server 1), then step S1 proceeds. In step S1, the overloaded server host in the server 1 sends a message for indicating an overload status thereof to a system monitoring host 4, whereby a host name of the overloaded server host is retrieved by a receiving module 41. Then, step S2 proceeds.

In step S2, a searching module 42 searches geographical location data stored in a database 40 corresponding to the retrieved host name obtained from the receiving module 41, wherein the database 40 stores data of host names, IP addresses and geographic locations of latitude and longitude for server hosts of the server 1. Then, step S3 proceeds.

In step S3, according to the searched data for the overloaded server host, the searching module 42 further searches another record of geographic location data close to the geographic location of the overloaded server host, and retrieves a host name of a corresponding server host located in proximity to the overloaded server host. Then, step S4 proceeds.

In step S4, a responding module 43 obtains the retrieved host name from the searching module 42, and then sends a linkage request to the correspondingly retrieved server host of the server 1. Then, step S5 proceeds.

In step S5, the responding module 43 determines if such a server host is overloaded and proposes an overload message. If this server host is overloaded, step S3 returns; or else, step S6 proceeds.

In step S6, the responding module 43 links the computer device of the client 2 to the retrieved server host of the server 1.

By using the above system and method for monitoring server host operation of the invention, a database 40 is established in the monitoring system, and structured by classifying server hosts in a server 1 according to geographic locations of the server hosts. This allows the monitoring system to desirably search in the database 40 for other server hosts that are geographically close to an overloaded server host in the server 1. Therefore, when a requested server host of the server 1 is overloaded, it can stop receiving further linkage requests from a client 2, and the monitoring system would assign another properly-loaded server host that is geographically close to the requested server host, to accomplish linkage with the client 2, such that the client 2 can immediately interact with the server 1.

The invention has been described using exemplary preferred embodiments.

However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for monitoring server host operation, for use with a monitoring system connected to a plurality of server hosts in a server, wherein when an overloaded server host receives a linkage request from a computer device of a client, the monitoring system allows another properly-loaded server host to be linked to the computer device of the client, so as to achieve immediate interaction between the client and the server; the method comprising the steps of:

(1) obtaining a host name of the overloaded server host via the monitoring system;

(2) searching in a database for geographic location data corresponding to the obtained host name via the monitoring system, wherein the database stores data of host names and corresponding geographic locations for server hosts in the server;

(3) searching in the database for another record of geographic location data close to the location of the overloaded server host via the monitoring system, and retrieving a host name of a corresponding server host located in proximity to the overloaded server host;

(4) sending a linkage request to the retrieved server host via the monitoring system, and determining if the retrieved server host is overloaded; if yes, returning to the step (1), or otherwise proceeding with step (5); and (5) linking the computer device to the retrieved server host via the monitoring system, so as to allow immediate interaction between the client and the server.

2. The method of claim 1, wherein the monitoring system comprises:

a database, including data of host names, IP (Internet Protocol) addresses, and corresponding geographic locations for server hosts in the server;

a receiving module, for obtaining a host name of an overloaded server host that is requested for linkage by the computer device of the client;

a searching module, for receiving the obtained host name from the receiving module, so as to search in the database for geographical location data corresponding to the received host name of the overloaded server host, whereby the searching module further searches for another record of geographic location data close to the location of the overloaded server host, so as to retrieve a host name of a corresponding server host located in proximity to the overloaded server host; and a responding module, for receiving the retrieved host name from the searching module, and sending a linkage request to the retrieved server host, wherein if the retrieved server host is overloaded, the searching module performs further searches until finding a properly-loaded server host in the server, so as to allow the computer device of the client to be linked to the properly-loaded server host.

3. The method of claim 2, wherein the geographic location is represented by latitude and longitude.

4. The method of claim 1, wherein the monitoring system is established in the server.

5. A system for monitoring server host operation, for allowing a computer device of a client to be linked to a properly-loaded server host in a server if the computer device requests for linkage with an overloaded server host, so as to achieve immediate interaction between the client and the server; the system comprising:

a database, including data of host names, IP (Internet Protocol) addresses, and corresponding geographic locations for server hosts in the server;

a receiving module, for obtaining a host name of the overloaded server host that is requested for linkage by the computer device of the client;

a searching module, for receiving the obtained host name from the receiving module, so as to search in the database for geographical location data corresponding to the received host name of the overloaded server host, whereby the searching module further searches for another record of geographic location data close to the location of the overloaded server host, so as to retrieve a host name of a corresponding server host located in proximity to the overloaded server host; and a responding module, for receiving the retrieved host name from the searching module, and sending a linkage request to the retrieved server host, wherein if the retrieved server host is overloaded, the searching module performs further searches until finding a properly-loaded server host in the server, so as to allow the computer device of the client to be linked to the properly-loaded server host.

6. The system of claim 5, wherein the geographic location is represented by latitude and longitude.

7. The system of claim 5, wherein the system for monitoring server host operation is established in the server, and connected to server hosts of the server.

* * * * *